No. 689,506. Patented Dec. 24, 1901.
M. MOLL.
SCUTTLE OPERATING DEVICE.
(Application filed May 29, 1901.)
(No Model.)
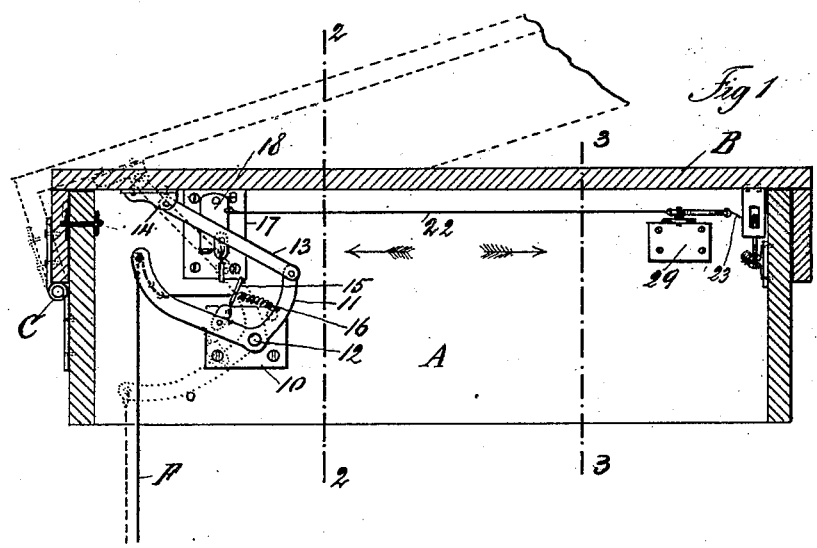
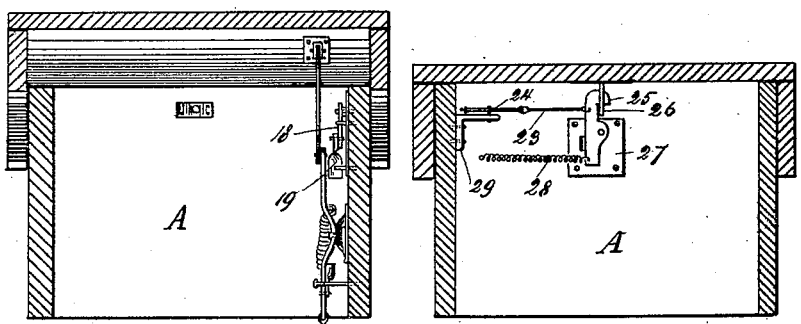
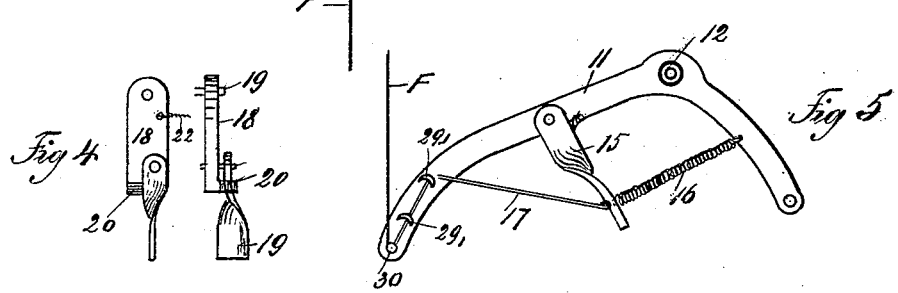
WITNESSES
F. F. Seller
F. A. Stewart
INVENTOR
Markus Moll
BY
Edgar Peters
ATTORNEYS

UNITED STATES PATENT OFFICE.

MARKUS MOLL, OF NEW YORK, N. Y.

SCUTTLE-OPERATING DEVICE.

SPECIFICATION forming part of Letters Patent No. 689,506, dated December 24, 1901.

Application filed May 29, 1901. Serial No. 62,329. (No model.)

*To all whom it may concern:*

Be it known that I, MARKUS MOLL, a citizen of the United States, residing at New York, in the county of New York and State of New York, have invented certain new and useful Improvements in Scuttle-Operating Devices, of which the following is a full and complete specification, such as will enable those skilled in the art to which it appertains to make and use the same.

The object of my invention is to provide a combined scuttle lifting and securing device by the use of which a scuttle may be raised or lowered from a distance and which when lowered into the closed position will be automatically locked, so as to prevent opening of the same from the outside.

To such ends my invention consists of a spring-catch coacting with a suitable hasp or similar device to lock the scuttle, a spring normally forcing the catch into the locking position, a scuttle-lifting device composed of a compound lever, means for actuating the lever mechanism for moving the catch into the releasing position, and mechanism carried by the lifting-lever for actuating the catch-actuating mechanism upon the first movement of the scuttle-lifting lever, so as to release the catch, all as hereinafter more fully shown and described.

In the accompanying drawings, forming part of this specification, in which like letters and numerals of reference designate corresponding parts in the several views, Figure 1 is a side view, in longitudinal vertical section, of a scuttle-casing with the scuttle locked in position thereon, the same being provided with my improved combined scuttle lifting and securing device, the dotted lines showing the scuttle as it appears when in the raised position. Fig. 2 is a view of the scuttle and lifting mechanism shown in Fig. 1, taken in section on the line 2 2 thereof looking to the left. Fig. 3 is a view of the fastening or securing mechanism in section on the line 3 3 of said Fig. 1 looking to the right. Fig. 4 is a view in detail on an enlarged scale, taken from the front side of the double-pivoted dog by the movement of which the catch or securing device is operated; and Fig. 5 is a side view in detail of the main lever with the pivoted dog actuating the dog shown in Fig. 4 connected with the same, showing the manner of connecting the cord for actuating the entire device with such lever.

Referring to the drawings, A designates the rectangular frame surrounding the scuttle-opening, which is closed at the top by the scuttle B, which is hinged thereto at one end, as shown at C. Rigidly secured to the side of the casing A, adjacent to the hinged end C of the scuttle, is a plate 10, to which is pivotally secured the bell-crank lever 11, to the short end of which is pivotally connected the connecting-rod 13, which is pivotally connected at the other end with the scuttle B by a pivoted joint, as shown at 14. Pivoted to the bell-crank lever 11, on the longer arm thereof a short distance from the pivot-point 12 thereof, is a dog 15, normally forced toward the short arm of the lever by a spring 16, and secured to this dog 15 is the actuating-cord F, which passes first through the hole 30 in the extreme end of the longer arm of the lever 11, thence through two lead-rings 29, from the last of which it continues to the dog 15, to which it is secured at the upper outer movable end thereof, by which construction upon the actuating-cord F being pulled down the lever 11 will not be actuated until the dog 15 has been drawn fully back. Located above the plate 10 and secured in a similar manner to the side wall of the scuttle-opening casing A is a plate 17, to which is pivotally secured by a pivot-pin 19 a downwardly-depending vibrating plate 18, to the bottom of which is pivotally secured the downwardly-depending swinging dog 19', capable of being swung freely away from the hinged end of the scuttle, but when forced in the opposite direction toward such hinged end by reason of its abutment against a projection 20 on the plate 18 always swinging such plate 18 toward the hinge C.

Secured to the scuttle-opening frame or casing A at the end opposite to the hinged end C is a plate 27, to which is pivoted a catch 25, kept normally in the securing position by a spring 28 and coacting with a hasp 26, secured to the scuttle to lock the same in the closed position. This catch 25 is moved into the releasing position, so as to be free of contact with the hasp 26 by the action of the cord or wire 23, connected with a bell-crank lever 24, pivotally supported upon a suitable bracket 29, which bell-crank lever is in operative connection with the pivot-plate 18 by means of a cord or wire 22. By this arrangement it will be seen that, the scuttle being closed and securely locked by the catch 25 and hasp 26 in the position shown in Figs. 1 to 3, if now the cord F be pulled down the first pressure exerted thereon will draw the pivoted dog 15 to the left, and its end coming in contact with the lower end of the dog 19' will force the same against the projection 20 of the swinging plate 18, which will thereby be forced to the left, and this movement of the plate 18, exerted on the catch 25 through the medium of the wires 22 and 23 and bell-crank lever 24, will draw the catch 25 out of the hasp 26, and thus leave the scuttle B unlocked and capable of being lifted into the position shown in dotted lines in Fig. 1. As soon as the lever 15 has been drawn fully back the lever 11 will begin to move downward, and this motion exerted upon the scuttle through the connecting-rod 13 will lift the scuttle into the open position shown in the dotted lines before referred to, in which it may be secured by properly securing the end of the line F. When it is desired to close the scuttle, the cord F being released from pressure, the scuttle will drop of its own weight, the dog 15 will swing back by the dog 19', which will swing freely back, so as to permit such passage, and the hasp 26 will force the catch 25 back until the lip of such catch is able to enter the hole of the hasp, when the parts will be then in the position shown in full lines in Figs. 1 to 3.

Passing through the end wall of the casing above the hinge C from the interior, so as to project a short distance beyond the casing-wall upon the outside, as shown in Fig. 1, is a securing-pin 32, normally formed integral with a plate 33, which is secured upon the inner side of such end wall by suitable screws, (not shown,) and the end of the pin 32 extends into a hole formed to receive it in the end piece of the scuttle B, and usually such hole is formed in and through a metallic plate 34, screwed or otherwise firmly secured to the inner side of such end piece, and by this construction it will be seen that the scuttle when closed will be firmly locked at both ends and cannot be lifted and opened, even though the hinges C should be removed therefrom.

It is evident that many changes in and modifications of the construction of my improved scuttle lifting and securing device may be made without departing from the scope of my invention, and I do not limit myself to the exact formation of construction herein shown.

Having thus fully described my invention, what I claim as new, and desire to secure by Letters Patent, is—

1. In a device of the class described, the combination with an automatic catch for locking the scuttle in a closed position, of a pivoted swinging plate, in actuating connection with the catch, a compound lever for lifting the scuttle into the open position, means for actuating the lever, and mechanism carried by the lever and actuated by the lever-actuating mechanism for moving the swinging plate, substantially as shown and described.

2. In a device of the class described, the combination with an automatic catch for locking the scuttle in the closed position, of a compound lever for lifting the scuttle into the open position, a swinging plate pivoted adjacent to the lever and in actuating connection with the catch, a dog carried by the lever adapted to be brought into actuating connection with the swinging plate, and means for first actuating the dog and afterward the lever, substantially as shown and described.

3. In a device of the class described, the combination with an automatic catch for locking the scuttle in the closed position of a swinging plate in actuating connection therewith, a dog pivoted thereto free to move in one direction and abutting against a projection of the plate on the other side so as to move such plate in unison therewith as the dog is moved in that direction, a lever for lifting the scuttle into the open position, a spring-retracted dog adapted to be brought into actuating connection with the dog carried by the swinging plate and pivoted to the scuttle-lifting lever, and means for moving the dog and afterward the lever, substantially as shown and described.

4. In a device of the class described, the combination with a scuttle secured to the scuttle-frame by a hinge, of a plate secured to the scuttle-frame adjacent to the free open swinging end thereof, a spring-catch pivoted to the plate, a hasp for the catch secured to the scuttle, a swinging plate pivotally supported by the scuttle-frame adjacent to the hinged end of the scuttle in actuating connection with the catch, a downwardly-depending dog pivoted to the swinging plate abutting on one side against a projection on the swinging plate and capable of free movement in the other direction, a bell-crank lever having a short arm and a long arm pivoted to the scuttle-frame, a connecting-rod pivotally connected at one end to the short arm of the lever and at the other end to the scuttle, a swinging dog adapted to coact with the pivoted dog of the swinging plate so as to move such dog and plate pivoted to the long arm of the lever, a spring for normally forcing such dog in one direction, and a cord moving freely through a hole or lead in the extreme end of the long arm of the lever and secured to the dog for actuating the same, substantially as shown and described.

In testimony that I claim the foregoing as my invention I have signed my name, in presence of the subscribing witnesses, this 25th day of May, 1901.

MARKUS MOLL.

Witnesses:
T. A. STEWART,
F. F. TELLER.